United States Patent
Nakano et al.

[11] Patent Number: 5,544,485
[45] Date of Patent: Aug. 13, 1996

[54] MASTER CYLINDER HAVING RESTRICTION MEANS WITH PISTON

[75] Inventors: Toshihiro Nakano, Chiryu; Hideaki Iijima, Kariya; Haruo Arakawa, Toyota, all of Japan

[73] Assignee: Aisin Seiki Kabushiki Kaisha, Kariya, Japan

[21] Appl. No.: 406,054

[22] Filed: Mar. 17, 1995

[30] Foreign Application Priority Data

Mar. 31, 1994 [JP] Japan ............... 6-062721

[51] Int. Cl.⁶ ............... B60T 11/16
[52] U.S. Cl. ............... 60/589; 60/591
[58] Field of Search ............... 60/591, 586, 589, 60/590

[56] References Cited

U.S. PATENT DOCUMENTS

| | | | |
|---|---|---|---|
| Re. 27,076 | 2/1971 | Swanson | 60/591 X |
| 2,847,827 | 8/1958 | Johnson | 60/589 |
| 5,042,254 | 8/1991 | Schonlau et al. | 60/591 X |
| 5,449,225 | 9/1995 | Burgdorf et al. | 60/589 X |

FOREIGN PATENT DOCUMENTS

| | | |
|---|---|---|
| 57-186568 | 11/1982 | Japan. |
| 58-211955 | 12/1983 | Japan. |
| 63-142251 | 9/1988 | Japan. |
| 63-176864 | 11/1988 | Japan. |
| 4-45971 | 10/1992 | Japan. |
| 2098294B | 11/1982 | United Kingdom. |

*Primary Examiner*—John E. Ryznic
*Attorney, Agent, or Firm*—Oblon, Spivak, McClelland, Maier & Neustadt, P.C.

[57] ABSTRACT

A master cylinder includes a cylinder body including a cylinder portion, a piston fit into the cylinder portion so as to fluid-tightly divide the cylinder portion into a pressure chamber and a supply chamber, a connecting passage which is disposed in the piston and which connects the pressure chamber with the supply chamber, a valve mechanism which is mounted on the piston and which disconnects the connecting passage when the piston is moved for a predetermined distance and a restriction member installed in the connecting passage for restricting a flow of a fluid from the pressure chamber into the supply chamber when the piston is operated and allowing the flow of the fluid from the supply chamber into the pressure chamber when the piston is returned.

6 Claims, 3 Drawing Sheets

MASTER CYLINDER HAVING RESTRICTION MEANS WITH PISTON

BACKGROUND OF THE INVENTION

1. Field of the Invention

This invention relates to a master cylinder for generating a pressure.

2. Description of the Related Art

A conventional master cylinder as prior art is disclosed in Japanese Utility Model Laid Open No. 63(1988)-176864. FIG. 4 is a partially enlarged sectional view of the conventional master cylinder shown in the prior art. In accordance with FIG. 4, the master cylinder comprises a cylinder body 100 including a cylinder portion 100a and a piston 105 including a seal member 101. The piston 105 is fluid-tightly fit in the cylinder portion 100a via the seal member 101 so as to establish a pressure chamber 102 connected to wheel cylinders and a supply chamber 103 connected to a reservoir. The piston 105 further includes a connecting passage 104 connecting the pressure chamber 102 with the supply chamber 103. The master cylinder further comprises a return spring 106 biasing the piston 105 to a rest position, a valve mechanism V and a restriction member 108 having an orifice 107 which is installed in the connecting passage 104. The valve mechanism V allows connection between the pressure chamber 102 and the supply chamber 103 when the piston 105 is located at the rest position. To the contrary, the valve mechanism V disconnects the pressure chamber 102 from the supply chamber 103 when the piston 105 moves for a predetermined distance.

In accordance with the above conventional master cylinder, a pressure is generated in the pressure chamber 102 before the valve mechanism V closes the connecting passage 104 since the restriction member 108 restricts a quantity of fluid flowed into the supply chamber 103 from the pressure chamber 102. Therefore, this conventional structure may improve the operation feeling at the time when the master cylinder operation is initiated.

However, because the restriction member 108 restricts a quantity of the fluid returning to the pressure chamber 102 from the supply chamber 103, the fluid flowing into the pressure chamber 102 via the connecting passage 104 is limited when the piston 105 is released. Therefore, since a negative pressure generated in the pressure chamber 102 continues to exist for a long time, the sealing force of the seal member 101 must be increased. Furthermore, it is difficult to shorten the brake pedal stroke when the brake pedal operation and the brake pedal release are alternately repeated (called a "double brake" when the master cylinder is applied to a brake system).

SUMMARY OF THE INVENTION

It is an object of the present invention to provide a master cylinder which can rapidly supply the fluid to the pressure chamber when the piston is returned.

It is another object of the present invention to provide a master cylinder which improves the operation feeling when the operation thereof is initiated.

It is a further object of the present invention to provide a master cylinder which is simple in structure and low in cost.

It is a further object of the present invention to provide a master cylinder which is small in size and light in weight.

It is a further object of the present invention to provide a master cylinder which can be easily manufactured.

It is a further object of the present invention to provide a master cylinder which is durable.

To achieve the above mentioned objects, a master cylinder in accordance with this invention comprises a cylinder body including a cylinder portion, a piston fit into the cylinder portion so as to fluid tightly divide the cylinder portion into a pressure chamber and a supply chamber, a connecting passage which is disposed in the piston and which connects the pressure chamber with the supply chamber, a valve mechanism which is mounted on the piston and which disconnects the connecting passage when the piston is moved for a predetermined distance and restriction means installed in the connecting passage for restricting a flow of a fluid from the pressure chamber into the supply chamber when the piston is operated and for allowing the flow of the fluid from the supply chamber into the pressure chamber when the piston is returned.

BRIEF DESCRIPTION OF THE DRAWINGS

The features and advantages of the master cylinder according to the present invention will be more clearly appreciated from the following description in conjunction with the accompanying drawings wherein.

DESCRIPTION OF THE PREFERRED EMBODIMENTS

Figure 1:
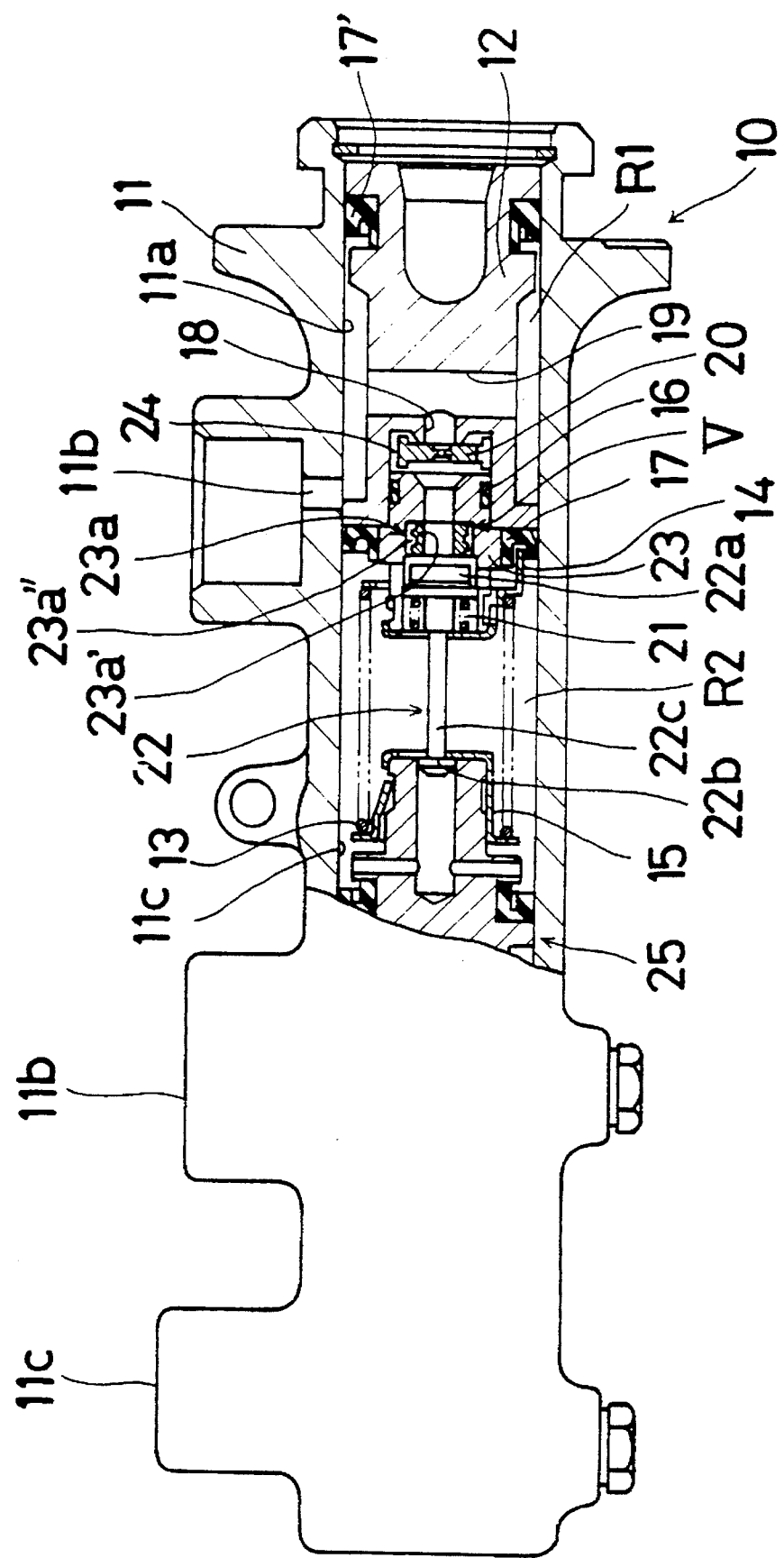
FIG. 1 is a partially sectional view of a master cylinder of the present invention.

In accordance with FIG. 1, a tandem type brake master cylinder 10 comprises a cylinder body 11 including a cylinder portion 11a, a piston 12, a return spring 13, first and second retainers 14, 15 and a valve mechanism V.

The piston 12 is fluid-tightly and slidably inserted in the cylinder portion 11a via a pair of piston cups 17, 17' which are mounted on an outer circumference of the piston 12. Further, the piston 12 partitions the cylinder portion 11a into a supply chamber R1 which is always connected to a brake reservoir (not shown in FIGURES) through a supply port 11b and a pressure chamber R2 which is always connected to a pressure conduit (not shown in FIGURES) through an outlet port 11c. The piston 12 further includes an axial connecting passage 18 and a radial connecting passage 19 which connect the supply chamber R1 with the pressure chamber R2.

Figure 2:
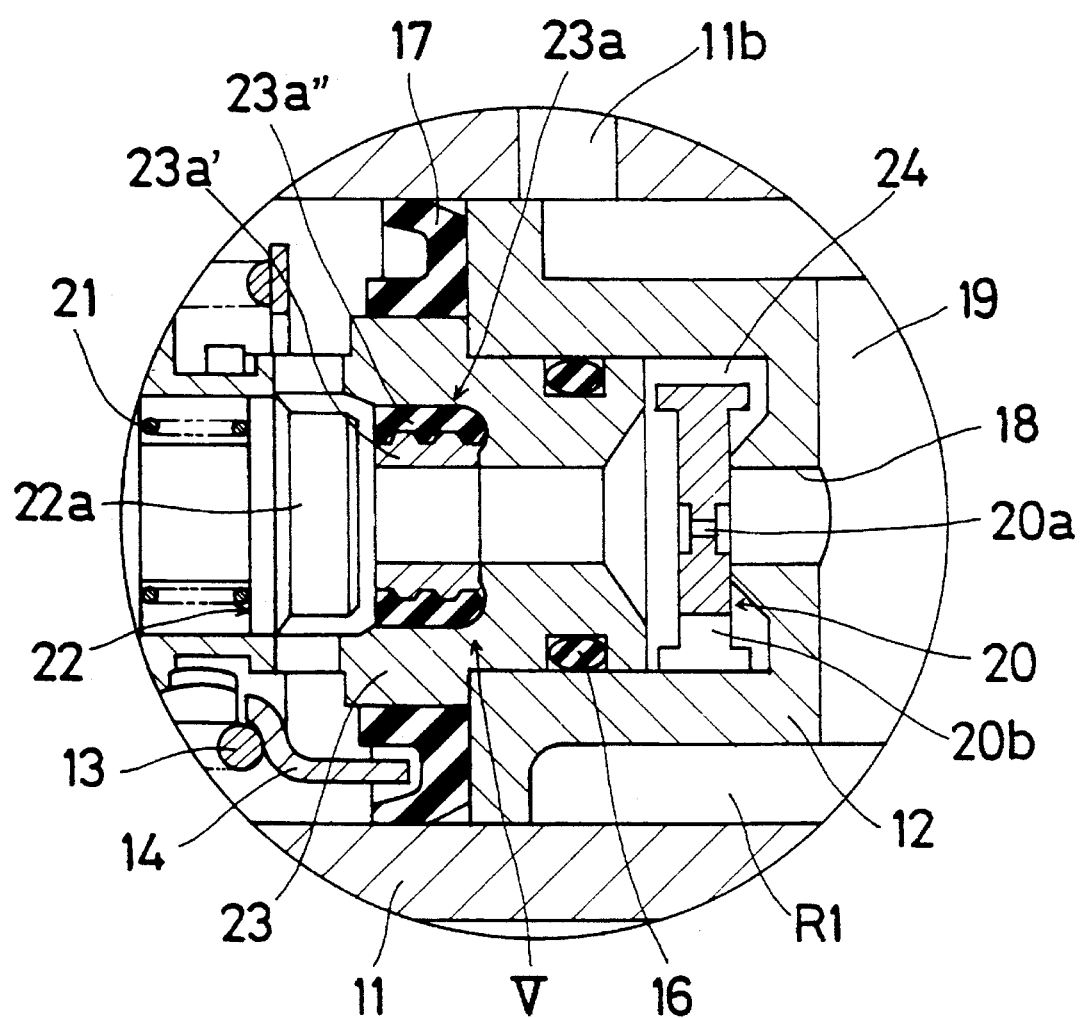
FIG. 2 is a partially enlarged sectional view of a master cylinder of the present invention which shows the construction around a valve mechanism.
Figure 3:
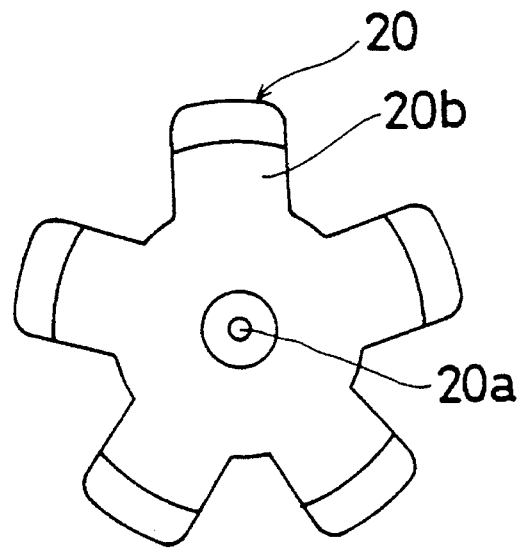
FIG. 3 is an elevational view of a restriction member of a master cylinder of the present invention.
Figure 4:
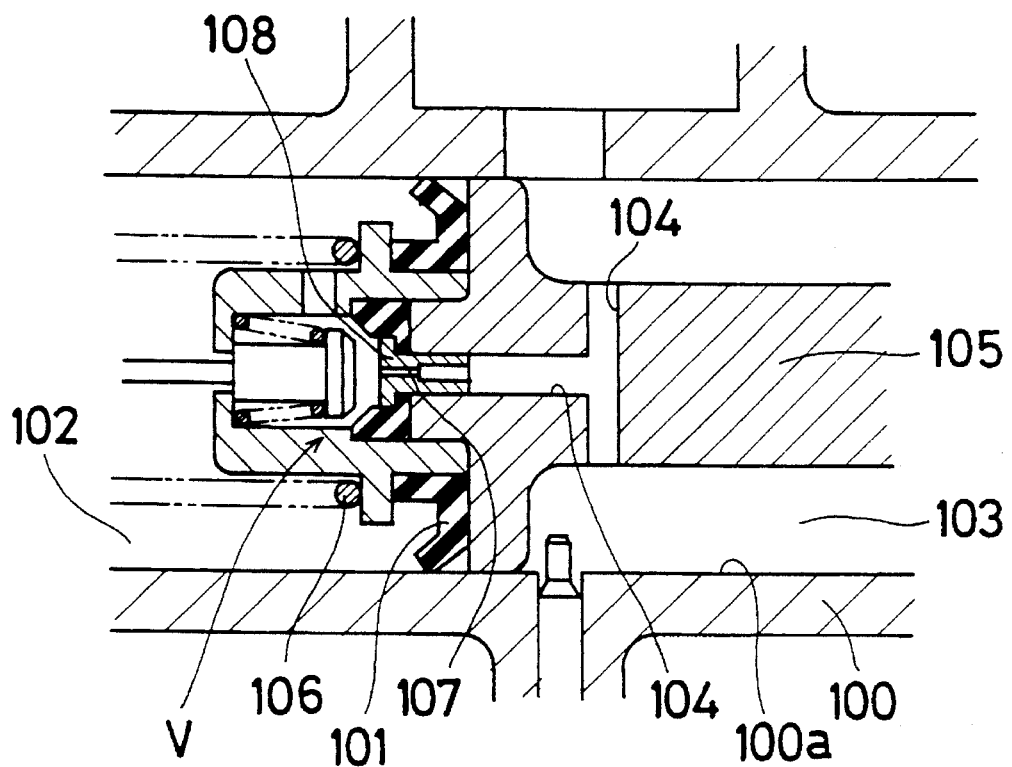
FIG. 4 is a partially enlarged sectional view of a master cylinder of the prior art which shows a construction around a valve mechanism.

A valve seat 23 forming the valve mechanism V is sealingly inserted into a front portion of the piston 12 via an O-ring 16 so as to establish a cylindrical inner space 24. A restriction member 20 having an orifice 20a (shown in FIG. 2) in the center thereof is disposed in the space 24 with clearances in the radial and axial directions. The restriction member 20 further includes a plurality of convex portions 20b (shown in FIG. 3) which are radially arranged.

The first retainer 14 is fit on the valve seat 23 so as to support each end of the return spring 13 and a spring 21 forcing a valve body 22 (described later) toward the piston 12. The second retainer 15 is fit on another piston 25 so as to support the other end of the return spring 13.

The valve mechanism V is formed with the valve body 22 and the valve seat 23 or the like. The valve body 22 includes a valve portion 22a. The valve seat 23 includes a seat portion 23a therein. The valve portion 22a of the valve body 22 is able to contact the seat portion 23a of the valve seat 23 so as to isolate the supply chamber R1 from the pressure chamber R2. The valve body 22 further includes an engaging portion 22b integrally connected with the valve portion 22a via a rod portion 22c. The engaging portion 22b can slide with a limited leftward stroke within the piston 25. It is engaged with the second retainer 15 so that a stroke of the valve body 22 to the right may be limited. The seat portion 23a is formed with a metal ring 23a' and a rubber ring 23a" which is disposed at an outer circumference of the metal ring 23a'.

An operation of the master cylinder 10 will be described hereinafter. When a brake pedal (not shown in FIGURES) is operated, the piston 12 is forced to move in the left direction (shown in FIG. 1) against an elastic force of the return spring 13. Since the volume of the pressure chamber R2 is decreased, fluid begins to flow into the supply chamber R1 from the pressure chamber R2 through the connecting passages 18, 19. Therefore, the restriction member 20 is moved in the right direction (shown in FIG. 2) so as to contact with the piston 12 at the left end of the connecting passage 18. Because the fluid flows into the supply chamber R1 through the orifice 20a, pressure builds up in the pressure chamber R2 according to a stroke speed of the piston 12. When the piston 12 is further moved in the left direction (shown in FIG. 1), the valve portion 22a of the valve body 22 contacts with the seat portion 23a of the valve seat 23 so as to disconnect the supply chamber R1 from the pressure chamber R2. Therefore, the pressure in the pressure chamber R2 is increased in proportion to the force applied to the piston 12.

When the brake pedal is released so as to release the force applied to the piston 12, the piston 12 is returned by the elastic force of the return spring 13. At this moment, the piston 12 is moved in the right direction and the restriction member 20 is separated from the piston 12. The valve body 22 is separated from the seat member 23a against the elastic force of the spring 21 by negative pressure generated in the pressure chamber R2 by the stroke of the piston 12. Therefore, the fluid flows into the pressure chamber R2 from the supply chamber R1 through the outer circumferential portion of the restriction member 20, the orifice 20a and between the convex portions 20b so as to quickly cancel the negative pressure in the pressure chamber R2.

On the other hand, although the valve body 22 is moved in the right direction (shown in FIG. 1) relative to the piston 25, the engaging portion 22b is engaged with the second retainer 15 in order that movement of the valve body 22 is limited in the right direction. When the piston 12 is further moved in the right direction, the valve body 22 and the seat portion 23a are completely separated from each other so as to connect the supply chamber R1 with the pressure chamber R2.

In accordance with the invention, because the restriction member 20 allows the flow of the fluid into the pressure chamber R2 from the supply chamber R1 when the piston 12 is returned, the fluid can rapidly flow into the pressure chamber R2 from the supply chamber R1 so as to shorten the time when the negative pressure in the pressure chamber R2 prevails.

To the contrary, since the restriction member 20 restricts the flow of the fluid into the supply chamber R1 from the pressure chamber R2 when the piston 12 is operated, the pressure is rapidly built up in the pressure conduit. Further, because the master cylinder 10 does not rigidly support the restriction member 20, the master cylinder 10 can be lower in cost.

Further, because the piston 12 and the valve seat 23 are engaged with each other via the O-ring 16, manufacturing tolerances between the piston 12 and the valve seat 23 can be absorbed. Therefore, since the manufacturing tolerances of the piston 12 and the valve seat 23 can be large, the master cylinder 10 can be easily manufactured.

Further, because the piston cup 17 is provided to be contacted with the piston 12 and the valve seat 23, the piston cup 17 can seal between the piston 12 and the cylinder portion 11a and between the piston 12 and the valve seat 23.

Further, because of the piston cup 17 seal between the piston 12 and the valve seat 23, the O-ring 16 does not receive the pressure of the fluid in the pressure chamber R2, and so is not damaged.

When the master cylinder 10 is applied to an automatic brake system, an oil pump sucks the fluid from the pressure chamber R2 and applies the fluid pressure to wheel brakes. Because the pressure in the pressure chamber R2 is lower than that in the supply chamber R1 when the oil pump sucks the fluid from the pressure chamber R2, the restriction member 20 is moved to be separated from the piston 12. Therefore, the fluid flow through the connecting passages 18, 19 is not restricted. Therefore, the driving force of the oil pump can be reduced and cavitation can be reduced. Consequently, the oil pump can be miniaturized in order to reduce the cost thereof.

Although in accordance with the above embodiment the master cylinder is applied to a tandem type brake master cylinder, the master cylinder of the invention can also be applied to a single type master cylinder. Further, the master cylinder of the invention can also be applied to a clutch master cylinder.

While the invention has been particularly shown and described with reference to preferred embodiment thereof, it will be understood by those skilled in the art that the foregoing and other changes in form and details can be made therein without departing from the spirit and scope of the invention.

What is claimed as new and desired to be secured by Letters Patent of the United States is:

1. A master cylinder comprising:

a cylinder body including a cylinder portion;

a piston fit into the cylinder portion so as to fluid-tightly divide the cylinder portion into a pressure chamber and a supply chamber;

a connecting passage in the piston and which connects the pressure chamber with the supply chamber;

a valve mechanism mounted on the piston for closing the connecting passage when the piston is moved in a predetermined direction; and restriction means installed in the connecting passage for restricting a flow of a fluid from the pressure chamber into the supply chamber when the piston is moved in the predetermined direction and for allowing the flow of the fluid from the supply chamber into the pressure chamber when the piston is moved in a direction opposite the predetermined direction.

2. A master cylinder as recited in claim 1, wherein the restriction means comprise a restriction member having an orifice and communicating with said connecting passage, the restriction member being disposed so as to be able to move in the axial direction of the piston.

3. A master cylinder as recited in claim 2, wherein the restriction member further includes a plurality of axially extending convex portions.

4. A master cylinder comprising:

a cylinder body including a cylinder portion;

a piston slidably disposed in the cylinder portion so as to divide the cylinder portion into a pressure chamber and a supply chamber and movable by a pedal operation of a vehicle;

a return spring forcing the piston toward a non-operating position of the piston;

a connecting passage which is disposed in the piston and which connects the pressure chamber with the supply chamber;

a valve mechanism which is mounted on the piston and which disconnects the connecting passage when the piston is moved from the non-operating position for a predetermined distance; and restriction means installed in the connecting passage for restricting a flow of a fluid from the pressure chamber into the supply chamber when the piston is moved from the non-operating position and allowing the flow of the fluid from the supply chamber into the pressure chamber when the piston is returned toward the non-operating position.

5. A master cylinder as recited in claim 4, wherein the restriction means comprise a restriction member having an orifice and communicating with said connecting passage, the restriction member being disposed so as to be able to move in the axial direction of the piston.

6. A master cylinder as recited in claim 5, wherein the restriction member further includes a plurality of axially extending convex portions.

* * * * *